United States Patent [19]

Brandelli

[11] 3,994,313
[45] Nov. 30, 1976

[54] TOILET BOWL VALVE

[76] Inventor: Anthony R. Brandelli, 2418 W. 256th St., Lomita, Calif. 90717

[22] Filed: Feb. 20, 1975

[21] Appl. No.: 551,364

[52] U.S. Cl. .................................. 137/437; 4/41; 4/67 R; 137/444; 137/451; 251/118
[51] Int. Cl.² ...................................... F16K 31/18
[58] Field of Search ........... 137/434, 437, 441, 444, 137/451, 414, 436; 4/41, 57 R, 57 P, 67 R; 251/118

[56] References Cited
UNITED STATES PATENTS

| | | | |
|---|---|---|---|
| 2,283,973 | 5/1942 | Criss | 137/444 |
| 2,318,236 | 5/1943 | Layton | 137/444 |
| 2,329,337 | 9/1943 | Criss et al. | 137/444 |
| 2,382,500 | 8/1945 | Owens | 137/437 |
| 2,476,310 | 7/1949 | Langdon | 137/451 |
| 2,492,436 | 12/1949 | Owens | 137/444 |
| 2,581,043 | 1/1952 | Owens | 137/437 |
| 2,799,290 | 7/1957 | Svirsky | 137/436 |
| 3,194,258 | 7/1965 | Grant | 137/451 |
| 3,242,940 | 3/1966 | Sirotek | 137/437 |
| 3,386,462 | 6/1968 | Walters | 137/444 |
| 3,693,649 | 9/1972 | Gordon et al. | 137/414 |

Primary Examiner—Martin P. Schwadron
Assistant Examiner—G. L. Walton
Attorney, Agent, or Firm—William C. Babcock

[57] ABSTRACT

A diaphragm controlled toilet bowl valve of simple construction that is substantially silent in operation, will not permit water to be siphoned from the tank in which it is disposed during an emergency in which the pressure of water in the supply lines decreases substantially, and one in which the actuating float is easily adjusted without hindering or deforming the rod on which it is supported.

7 Claims, 7 Drawing Figures

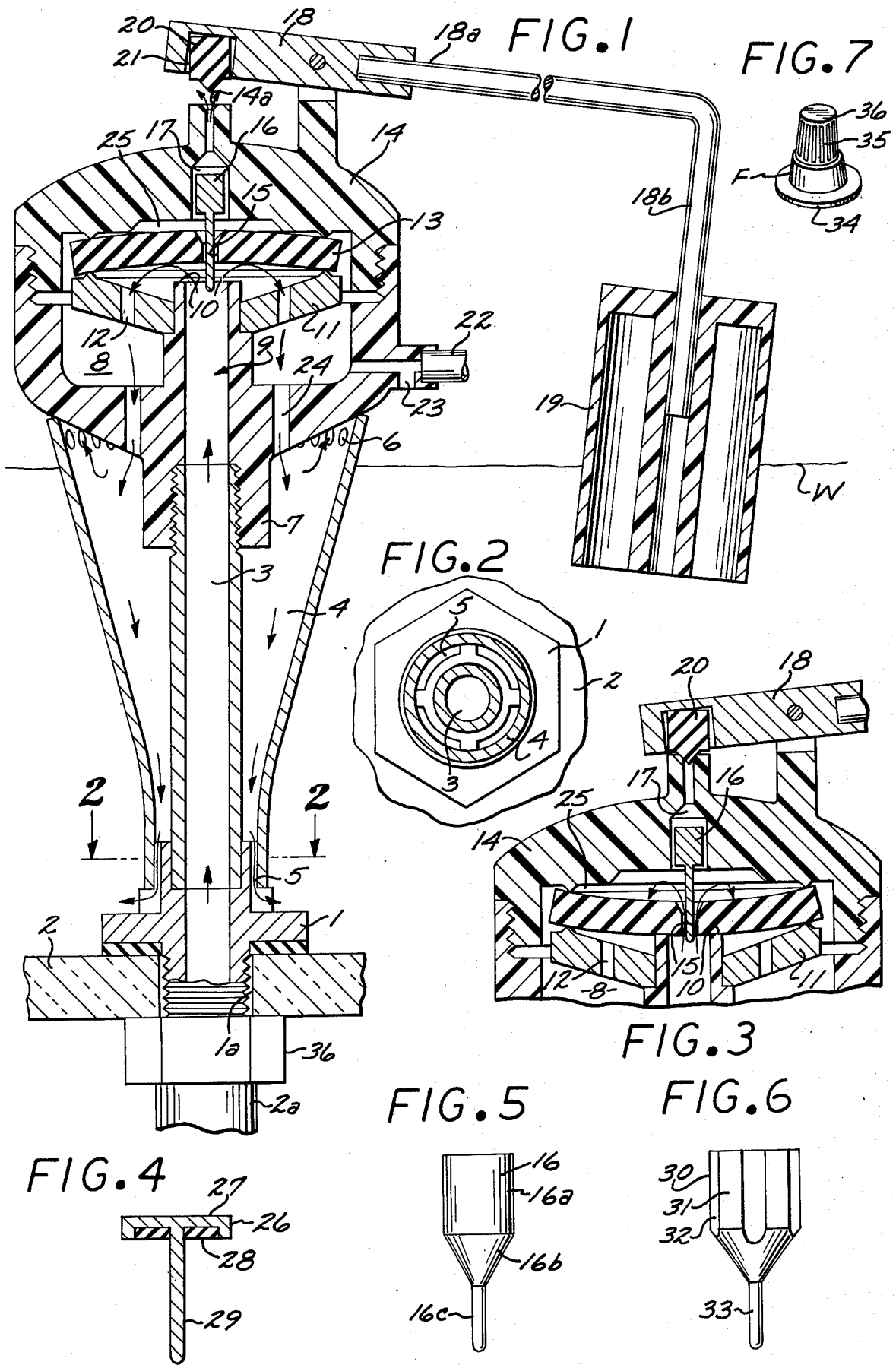

TOILET BOWL VALVE

BACKGROUND OF THE INVENTION

1. Field of the Invention

Toilet bowl valve.

2. Description of the Prior Art

In the past, various types of toilet bowl valves have been devised and used. However, these prior art devices have operational disadvantages that are annoying to the user, namely, that they are unduly complicated and difficult to adjust to a condition where they operate at optimum efficiency.

A primary object in devising the present invention is to provide a valve in which the main water pressure is employed to close a float operated valve in conjunction with a deformable diaphragm and one of a variety of metering pins, and with the valve operating with a minimum of noise as the tank in which it is disposed fills with water.

Another object of the invention is to provide an anti-siphon valve in which the float that forms a part thereof is easily adjusted without bending or deforming the rod on which it is supported.

SUMMARY OF THE INVENTION

A toilet bowl valve in which a deformable diaphragm and metering pin so cooperate with a pivotally supported float that the tank in which the valve is situated may be filled rapidly with water with a minimum of noise, and with the assurance that water will not be siphoned from the tank should the pressure of water in the supply line decrease appreciably.

BRIEF DESCRIPTION OF THE DRAWING

FIG. 1 is a longitudinal cross-sectional view of the valve supported from the bottom of a water holding tank of a toilet;

FIG. 2 is a transverse cross-sectional view taken on the line 2—2 of FIG. 1;

FIG. 3 is a fragmentary cross-sectional view of the valve in the closed position;

FIG. 4 is a longitudinal cross-sectional view of a first alternate form of metering pin;

FIG. 5 is a longitudinal cross-sectional view of a second alternate form of metering pin;

FIG. 6 is a side elevational view of a third form of metering pin; and

FIG. 7 is a perspective view of a filter that may be used with the device.

DESCRIPTION OF THE PREFERRED EMBODIMENTS

The numeral 1 in FIG. 1 illustrates a tubular screw threaded fitting that engages a bore 1a formed in the bottom of a primary tank 2. Water at line pressure is supplied to the interior of fitting 1 by a pipe 2a. A tube 3 extends upwardly from the fitting 1. Water may flow upwardly in tube 3 from pipe 2a.

A conical secondary tank 4 may be mounted in an inverted position on the fitting 1. Longitudinal ports 5 are defined in the fitting 1 through which water in secondary tank 4 may flow outwardly into the primary tank 2.

A number of circumferentially spaced openings 6 are formed in the upper portion of secondary tank 4, and are located above the height of the maximum surface level of water W in the primary tank 2. The openings 6 serve the dual function of serving as secondary discharges for water from tank 4 into primary tank 2, and also in an anti-siphon capacity to prevent water from being drawn from tank 2 into pipe 2a.

A valve body 7 is mounted on the upper end of tube 3. Body 7 defines a chamber 8 into which water W can flow from tube 3. A central hollow hub 9 is provided in the valve body 7, and this hub includes a valve seat 10 on the upper end thereof. A flat cone-shaped ring 11 is rotatably mounted on the upper end of hub 9. Ring 11 is provided with a number of circumferentially spaced transverse openings 12 through which water W can flow in the direction indicated by arrows in FIG. 1.

A resilient diaphragm 13 is mounted between ring 11 and a cap 14, which cap may be screw threaded to body 7 as shown in FIG. 1. The peripheral portion of diaphragm 13 is clamped between the ring 11 and cap 14. The central portion of diaphragm 13 is free to flex up or down. The ring 11 is rotatably supported as shown in FIG. 1 to prevent the diaphragm 13 from being cut as cap 14 is screw threaded onto body 7.

Diaphragm 13 has a central transverse hole 15. A metering pin 16 is provided and is in axial alignment with hole 15. The pin may be of the type shown in FIG. 1 or the alternate forms illustrated in FIGS. 4 and 5. The metering pins may be either stationary or floating, which ever is found most desirable. In FIG. 1, metering pin is illustrated as being disposed at least partially in a port 17 defined in cap 14. Water W can flow around metering pin 16 and discharge from the upper portion of cap 14 as shown by arrows in FIG. 1.

An arm 18 is provided that includes first and second L-shaped legs 18a and 18b. Arm 18 is pivotally mounted on cap 14. A float 19 in the form of an inverted cup is provided, which cup frictionally engages leg 18b and is longitudinally adustable thereon. A valve 20 is mounted for free movement in a recess 21 formed in arm 18 of first leg 18a. The valve 20 can adjust to accurately seat in hole 14a when the float 19 pivots arm 18 in a counter clockwise direction as viewed in FIG. 1.

When the valve 20 seats on the hole 14a all flow of water W into tank 2 is effectively terminated for reasons that will later be explained. A refill tube 22 extends from body 7 and permits flow of water into the tube when the valve is in the open position shown in FIG. 1. A secondary anti-siphon opening 23 is formed in refill tube 22 as shown in FIG. 1. A number of circumferentially spaced, longitudinal openings 24 are formed in body 7, and permit water to flow into secondary tank 4 when the valve is in the open position shown in FIG. 1.

When the valve 20 is seated in hole 14a due to counter clockwise pivotal movement of arm 18, as viewed in FIG. 1, the flow of water from port 17 is terminated. Hydraulic pressure from water in the pipe 2a will however continue to exert pressure in tube 3, and thence through hole 15 into the pressure chamber 25 defined between cap 14 and the upper surface of diaphragm 13. This pressure flexes the diaphragm 13 downwardly against seat 10 as shown in FIG. 3 to terminate all flow of water through the valve.

The primary tank 2 is filled through two sources, with the main source being the ports 5 and the secondary sources being the holes 6.

The metering pin 16 as may be seen in FIG. 1 is movable in the port 17 and includes a cylindrical body 16a that develops on the lower end into a downwardly and inwardly tapering portion 16b from which an elongate member 16c depends. The member 16c is of smaller transverse cross section than that of the hole 15 into which it extends.

When the primary tank 2 is flushed by valve means (not shown), the water level is lowered, and the arm 18 and float 19 pivot clockwise from the position shown in FIG. 3 towards the positions illustrated in FIG. 1. As the device assumes the position shown in FIG. 1, valve 20 separates from seat 14a, and allows water in pressure chamber 25 to flow upwardly therefrom through port 17. The escape of water from pressure chamber 25 allows diaphragm 13 to bow upwardly as shown in FIG. 1. Water may now flow upwardly from supply pipe 2a and tube 3 to flow downwardly through openings 12 and 24 as shown by arrows in FIG. 1 into the interior of secondary tank 4 to escape therefrom through ports 5 into primary tank 2.

The openings 12 are of such size that water can discharge into chamber 8 at a faster rate than it can flow therefrom through openings 24. As a result a back pressure builds up in chamber 8. This back pressure causes water in chamber 8 to discharge into refill tube 22 at a sufficient velocity as to span the secondary anti-siphon opening 23. When the secondary tank 4 fills with water, water will discharge therefrom not only through the ports 5 but the openings 6 as well. As the device moves between the positions shown in FIGS. 1 and 3, the metering pin 16 moves relative to the hole 15 to maintain the latter free of foreign material. The secondary tank 4 and the openings 6 therein serve a three fold purpose. The filled secondary tank 4 serves to quiet the sound of the primary tank 2 being filled with water. The openings 6 act as secondary fill outlets for the primary tank 2. The openings 6 also act as primary anti-siphon openings.

When the device is in the position shown in FIG. 1, water will discharge into the primary tank 2 until the float 19 moves arm 18 and valve 20 to the position shown in FIG. 3. Water flowing into pressure chamber 25 will cause the diaphragm 13 to bow downwardly to be brought into pressure sealing contact with the valve seat 10 whereupon flow of water through ports 5 and openings 6 terminates. Valve 20 is now in sealing contact with valve seat 14a and flow of water through port 17 is likewise terminated. This termination of water is effected in primary tank 2 when the level W is below openings 6 as shown in FIG. 2. The float 19 is slidable on second leg 18b and is frictionally held at a desired position thereon. The float 19 may accordingly be disposed at a desired position on second leg 18b without bending the latter.

A first alternate form of floating pin 26 is shown in FIG. 4. When the first alternate form 26 of the pin is used, the valve 20 is eliminated. Pin 26 includes a head 27 that has an elastomeric liner 28 on the underside thereof, and an elongate member 29 extends downwardly from the head into hole 15 as shown in FIG. 4. When the device is in the position shown in FIG. 4 the liner 28 is in sealing contact with valve seat 14a. The first alternate form of floating pin 26 serves the same function as metering pin 16.

A second alternate form of metering pin 30 is shown in FIG. 6 that includes a cylindrical body 31 having a number of circumferentially spaced, longitudinal grooves 32 therein, and from which body 31 and elongate member 33 depends. Body 31 is frictionally held in a stationary position in port 17. Member 33 is of less transverse cross section than hole 15 in which it is positioned. The three forms of metering pins described serve to maintain hole 15 free of foreign material.

A filter F is shown in FIG. 7 that includes a frustoconical shell 36 that has narrow circumferentially spaced, longitudinal slits 35 therein that serve to remove foreign solid particles from water flowing upwardly through tube 3. Shell 36 has a circular flange 34 projecting outwardly therefrom that may be gripped between fitting 36 shown in FIG. 1 and the bottom of the threaded portion of fitting 1 to hold the shell 30 inside said fitting 1 which connects to tube 3.

The use and operation of the device has been described previously in detail and need not be repeated.

I claim:

1. In combination with a primary tank of a toilet from which a quantity of water is intermittently discharged, a device for refilling said primary tank with water to a predetermined level, said device including:
   a. an upwardly extending water inlet tube in said primary tank, said tube having a valve seat on an upper end thereof;
   b. a fitting that holds said inlet tube in a fixed position in said primary tank;
   c. a secondary tank extending around at least a portion of said inlet tube and supported by said fitting, said fitting having a first port therein that maintains communication between the interior of said secondary tank and the interior of said primary tank;
   d. a hollow valve body having said valve seat within the interior thereof, said valve body including a cap;
   e. a circular rigid member in said valve body mounted on said inlet tube, said member having a plurality of first openings therein;
   f. a single circular resilient diaphragm that has the periphery gripped between said rigid member and the interior surface of said valve body, said diaphragm having a central opening therein;
   g. a metering pin disposed in a second port in said cap and extending into said central opening in said diaphragm, and said central opening being of greater transverse area than that of said pin;
   h. float actuated means for closing said second port when water rises to said predetermined level in said primary tank by flowing through said inlet tube, first openings, second openings in said valve body that are in communication with the interior of said secondary tank, and said first port with water after said predetermined level is reached continuing to flow through said central opening into a confined space defined between said diaphragm and cap to force said diaphragm into sealing contact with said valve seat to terminate further flow of water into said primary tank;
   i. a toilet refill tube in communication with the interior of said secondary tank, with water discharging through said refill tube during the filling of said primary tank with water; and
   j. an anti-siphon opening in said refill tube, said anti-siphon opening disposed above said predetermined water level in said primary tank.

2. A device as defined in claim 1 in which said metering pin is movable in said second port, with said metering pin maintaining said central opening free of foreign material by said metering pin moving relative to said central opening.

3. A device as defined in claim 1 in which said metering pin occupies a stationary position in said second port, with said metering pin maintaining said central opening free of foreign material by said diaphragm flexing upwardly and downwardly and said central opening moving relative to said metering pin.

4. A device as defined in claim 1 in which said anti-siphon opening extends downwardly, with the flow of water into said secondary tank being sufficiently rapid that a back pressure is built up thereon, and said back pressure imparting sufficient velocity to water flowing through said refill tube that said water spans said anti-siphon opening.

5. A device as defined in claim 1 in which said secondary tank has a plurality of openings therein above said predetermined water level, said openings serving as primary anti-siphon openings and as secondary discharge openings for water from said secondary tank into said primary tank, and said secondary tank when filled with water minimizing the noise of water discharging into said primary tank.

6. A device as defined in claim 1 in which said float actuated means includes:

k. an L-shaped member pivotally supported on said valve body, said L-shaped member including first and second legs; and l. a float that frictionally engages said second leg and is slidably adjustable thereon; and m. a movable valve body controlled by said first leg, said valve body in sealing contact with said port when said water in said primary tank reaches said predetermined level.

7. A device as defined in claim 1 which further includes:

n. a strainer that includes a frusto-conical shell having a plurality of circumferentially spaced, longitudinal slits formed therein, with said shell on the open end thereof developing into an outwardly extending circular flange that is gripped between said fitting and said primary tank to dispose said shell in an upwardly extending position in said inlet tube to remove foreign solid particles from water entering said inlet tube.

* * * * *